(12) United States Patent
Ramanujam et al.

(10) Patent No.: US 11,570,228 B2
(45) Date of Patent: Jan. 31, 2023

(54) SYSTEM AND METHOD FOR MANAGING VIDEO STREAMING QUALITY OF EXPERIENCE

(71) Applicant: Sandvine Corporation, Waterloo (CA)

(72) Inventors: Srinidhi Chakravarthy Ramanujam, Bangalore (IN); Pradeep Karanth, Bangalore (IN); Sandeep Kumar, Bangalore (IN)

(73) Assignee: SANDVINE CORPORATION, Waterloo (CA)

( * ) Notice: Subject to any disclaimer, the term of this patent is extended or adjusted under 35 U.S.C. 154(b) by 0 days.

(21) Appl. No.: 17/490,029

(22) Filed: Sep. 30, 2021

(65) Prior Publication Data

US 2022/0124141 A1 Apr. 21, 2022

(30) Foreign Application Priority Data

Oct. 15, 2020 (IN) .............................. 202011044963

(51) Int. Cl.
*G06F 13/00* (2006.01)
*H04L 65/80* (2022.01)
(Continued)

(52) U.S. Cl.
CPC ............ *H04L 65/80* (2013.01); *H04L 43/062* (2013.01); *H04L 43/065* (2013.01); *H04L 43/0888* (2013.01)

(58) Field of Classification Search
CPC ..... H04L 65/80; H04L 43/062; H04L 43/065; H04L 43/0888
(Continued)

(56) References Cited

U.S. PATENT DOCUMENTS

2014/0181266 A1 6/2014 Joch et al.
2018/0332326 A1 11/2018 Yamagishi
(Continued)

FOREIGN PATENT DOCUMENTS

EP 3264709 B1 8/2018

OTHER PUBLICATIONS

De Fex Ismael et al; "New Objective QoE models for Evaluating ABR algorithms in DASH"; Computer Communications, Elsevier Science Publishers BV, Amsterdam, NL, vol. 158, May 11, 2020, pp. 126-140, XP086157533.
(Continued)

*Primary Examiner* — Kenneth R Coulter
(74) *Attorney, Agent, or Firm* — Amarok IP Inc.; Neil W. Henderson

(57) ABSTRACT

A method for managing Quality of Experience (QoE) for video streaming traffic flow on a network, the method including: collecting data associated with a plurality of video streaming traffic flows; creating a model based on the collected data; determining factors associated with a new video streaming traffic flow; analyzing the factors based on the model; determining a QoE score based on the analysis. A system for managing QoE for video streaming traffic flow on a network, the system including: a factor determination module configured to collect data associated with a plurality of video streaming traffic flows; a model module configured to create a model based on the collected data; an analysis module configured to determine factors associated with a new video streaming traffic flow and analyze the factors based on the model; and a QoE engine configured to determine a QoE score based on the analysis.

18 Claims, 11 Drawing Sheets

(51) Int. Cl.
  *H04L 43/062* (2022.01)
  *H04L 43/065* (2022.01)
  *H04L 43/0888* (2022.01)
(58) Field of Classification Search
  USPC .......................................... 709/231, 232, 224
  See application file for complete search history.

(56) References Cited

U.S. PATENT DOCUMENTS

2021/0112010 A1* 4/2021 May ..................... H04N 21/454
2021/0385168 A1* 12/2021 Rajasekar .......... H04N 21/2385

OTHER PUBLICATIONS

Extended European Search Report, European Patent Office, on corresponding EP Application No. 21201611.7, dated Mar. 7, 2022.

* cited by examiner

|  | Progressive Download | Realtime Streaming | Adaptive Streaming |
|---|---|---|---|
| Principle | Entire file is downloaded over HTTP | Server sends chunks of data based on client request in real time | Content encoded at multiple bitrates, Manifest file maintains details of chunks and type of encoding, Client requests best suited chunk from server based on b/w and buffer requirement |
| Protocol | HTTP | RTMP, RTSP over UDP | HTTP |
| Disadvantages | Wasted bandwidth, no control on quality | Requires additional tech stacks to be implemented | Needs multiple versions of same chunk to be encoded, stored |
| Examples | Piracy based sites – kisscartoon.info | Instagram | Youtube, Netflix, Prime Video, Disney+, Hulu and every major video provider. |
| Advantages | Simple, easy to setup | Can access any part of video without waiting for entire file | Chunks can be cached, reused, quality can be changed on the fly, includes Live Video |

Fig. 1

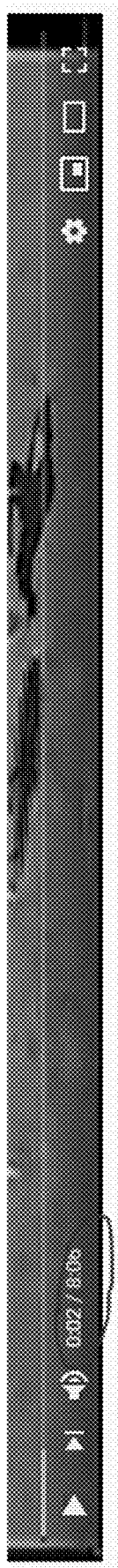
Fig. 5
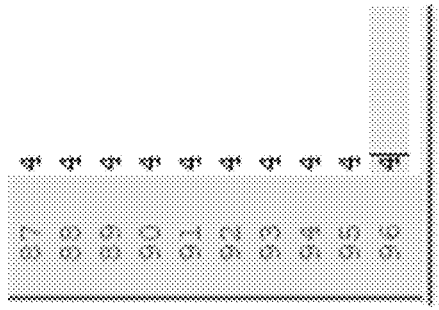
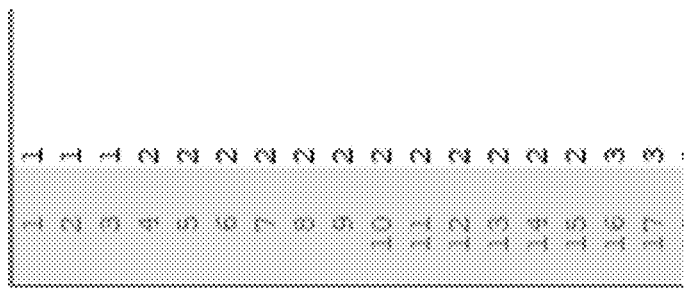
Fig. 6

| Td | Tc | Tv | buffer_health |
|---|---|---|---|
| 1 | 5 | 6 | 5 |
| 2 | 10 | 12 | 5 |
| 2 | 15 | 17 | 5 |
| 5 | 20 | 25 | 5 |
| 8 | 25 | 33 | 4 |
| 10 | 30 | 40 | 3 |
| ... | ... | ... | ... |

Fig. 8

| pkt_timestamp | frame_len | ip_len | src_ip | dst_ip | transport_type | src_port | dst_port | t5_len |
|---|---|---|---|---|---|---|---|---|
| 2.22344 | 301 | 287 | 1.0.0.24 | 1.0.0.36 | 6 | 45332 | 443 | 259 |
| 2.37888 | 64 | 50 | 1.0.0.24 | 1.0.0.36 | 6 | 45332 | 443 | 22 |
| 2.56753 | 996 | 981 | 1.0.0.24 | 1.0.0.36 | 6 | 45332 | 443 | 953 |
| 2.98767 | 216 | 202 | 1.0.0.24 | 1.0.0.36 | 6 | 45332 | 443 | 174 |
| 3.09782 | 71 | 57 | 1.0.0.36 | 1.0.0.24 | 6 | 45332 | 443 | 29 |
| 4.24342 | 302 | 288 | 1.0.0.24 | 1.0.0.36 | 6 | 443 | 45332 | 260 |
| 4.56564 | 64 | 50 | 1.0.0.24 | 1.0.0.24 | 6 | 45332 | 443 | 22 |

Fig. 9

| Time | Min_I5Len | MaxI5Len | .. | TotalActive Time us | MinActiveT ime us | MaxActive Time us | .. | AvgWind owSize | MaxWind owSize | .. | TotalBy tesUp | TotalByte sDown |
|---|---|---|---|---|---|---|---|---|---|---|---|---|
| 1 | 52 | 122 | | 1534 | 844 | 80 | | 480090 | 33553920 | | 14379 | 1534 |
| 2 | 52 | 232 | | 18336 | 1468 | 896 | | 935862 | 33553920 | | 33772 | 18336 |
| 3 | 52 | 322 | | 12086 | 2230 | 1397 | | 4276352 | 33553920 | | 34194 | 12086 |
| 4 | 52 | 543 | | 25876 | 832 | 811 | | 689028 | 33553920 | | 16396 | 25876 |
| 5 | 52 | 765 | | 34323 | 945 | 213 | | 609568 | 33553920 | | 34194 | 12036 |

Fig. 10

| Time | Min_I5Len | MaxI5Len | .. | TotalActiveTime us | MinActiveTime us | MaxActiveTime us | .. | buffer_health |
|---|---|---|---|---|---|---|---|---|
| 1 | 52 | 122 | | 1534 | 844 | 80 | | 5 |
| 2 | 52 | 232 | | 18336 | 1468 | 896 | | 5 |
| 3 | | | | | | | | 5 |
| .. | 52 | 765 | | 34323 | 945 | 213 | | 5 |
| 5 | 52 | 765 | | 34323 | 945 | 213 | | 4 |
| 6 | | | | | | | | 4 |
| .. | 52 | 765 | | 34323 | 945 | 213 | | 4 |
| 10 | | | | | | | | 3 |
| 11 | | | | | | | | 3 |
| .. | | | | | | | | 3 |
| 15 | | | | | | | | 1 |
| .. | | | | | | | | 1 |
| 20 | | | | | | | | 1 |

Fig. 11

SYSTEM AND METHOD FOR MANAGING VIDEO STREAMING QUALITY OF EXPERIENCE

FIELD

The present disclosure relates generally to managing computer network traffic. More particularly, the present disclosure relates to a system and method for managing video streaming quality of experience on a computer network.

BACKGROUND

Internet Data traffic has been growing quickly in developed and developing markets. Video streaming traffic tends to dominate the overall bandwidth and volume of data consumed. As such, there is a need to accurately calculate subscriber video experience. Understanding user experience while consuming streaming video has generally been identified by network operators as critical in evolving their infrastructure to next generation technologies. Without the right methods of estimating real world user experience, network operators may struggle to maintain their credibility in an increasingly competitive landscape. This may be exacerbated by the rise of a wide variety of Over the Top (OTT) video providers (YouTube, Disney+, Netflix, Amazon Prime Video, and the like, along with regional or country specific providers) that may host different types of content, different types of encoding and may cater to different types of audience demands for experiencing video. Further, a greater variety of programming and sporting events are being telecasted live on the Internet, as well as TV shows and movies increasingly shifting from traditional screens (movie theatres and terrestrial/cable television) to the Internet. As such, there is a need to more effectively manage, measure and monitor video quality on a network.

Network operators benefit from understanding how video streaming is being provided and consumed by end users to ensure quality of experience, congestion management, advanced data services, billing and charging related services, and the like. Given that videos may be streamed over a wide variety of devices including but not limited to smartphones, laptop/desktop computers, Smart Televisions, and the like, accurately understanding the nature of user experiences coupled with possible network-related incidents and outages that may impact user experience is a challenge. With the rise of end to end encryption for a lot of Internet traffic, network providers may not have access to the actual video information like audio/video codecs, frame-rate, position, duration of video in a given traffic flow.

The task of measuring video quality becomes even more challenging for systems that do not have full access to either the client side or the server side. These systems only have access to the data "on the wire" and typically include Internet Service Providers (ISPs) or network operators (generally referred to herein as operators) that deploy wired, wireless (mobile), and satellite networks.

There is therefore a need for improved systems and methods for managing video streaming quality of service and quality of experience.

The above information is presented as background information only to assist with an understanding of the present disclosure. No determination has been made, and no assertion is made, as to whether any of the above might be applicable as prior art with regard to the present disclosure.

SUMMARY

In an aspect, there is provided a method for managing Quality of Experience (QoE) for video streaming traffic flow on a network, the method including: collecting data associated with a plurality of video streaming traffic flows; creating a model based on the collected data; determining factors associated with a new video streaming traffic flow; analyzing the factors based on the model; determining a QoE score based on the analysis.

In some cases, the collected data may include: video buffer health, video resolution, throughput and device type In some cases, creating the model may include: determining a health of video buffer including: at predetermined intervals while each of the plurality of video streaming traffic flows plays: determining the playback time of a video; determining the real time of the video; and at the end of the video determining a health of the video buffer score based on a function of the playback time and the real time at the predetermined intervals; determining a video resolution score for each of the plurality of video streaming traffic flows; determining a throughput score for each of the plurality of video streaming traffic flows; determining a device type score for each of the plurality of video streaming traffic flows; and determining a weighting associated with each of the scores.

In some cases, the health of the video buffer scores may include a time dimension where previous buffer health scores at predetermined intervals are considered at following intervals of the buffer health score.

In some cases, analyzing the factors may include: determining a weight of each factor based on the model; and aggregating the weighted factors to determine the QoE score.

In some cases, the method may further include notifying a network provider associated with the video streaming traffic flows of QoE scores below a predetermined threshold.

In some cases, the method may further include: aggregating a plurality of QoE scores of network dimensions.

In some cases, the network dimensions may include: location; network type; application type; and application provider.

In another aspect, there is provided a system for managing Quality of Experience (QoE) for video streaming traffic flow on a network, the system including: a factor determination module configured to collect data associated with a plurality of video streaming traffic flows; a model module configured to create a model based on the collected data; an analysis module configured to determine factors associated with a new video streaming traffic flow and analyze the factors based on the model; and a QoE engine configured to determine a QoE score based on the analysis.

In some cases, the factor determination module may be configured to collected data comprising: video buffer health, video resolution, throughput and device type.

In some cases, model module may be configured to: determine a health of video buffer including: at predetermined intervals while each of the plurality of video streaming traffic flows plays: determine the playback time of a video; determine the real time of the video; and at the end of the video determine a health of the video buffer score based on a function of the playback time and the real time at the predetermined intervals; determine a video resolution score for each of the plurality of video streaming traffic flows; determine a throughput score for each of the plurality of video streaming traffic flows; determine a device type score for each of the plurality of video streaming traffic flows; and determine a weighting associated with each of the scores.

In some cases, the health of the video buffer scores may include a time dimension where previous buffer health scores at predetermined intervals are considered at following intervals of the buffer health score.

In some cases, the analysis module may be configured to determine a weight of each factor based on the model; and the QoE engine is configured to aggregate the weighted factors to determine the QoE score.

In some cases, the QoE engine may be configured to notifying a network provider associated with the video streaming traffic flows of QoE scores below a predetermined threshold.

In some cases, the QoE engine may be configured to aggregate a plurality of QoE scores of network dimensions.

In some cases, the network dimensions may include: location; network type; application type; and application provider.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 1 is a table illustrating the different types of video streaming services;

FIG. 5 illustrates a progression of a video stream;

FIG. 6 illustrates an example timestamp log;

FIG. 8 illustrates a table illustrating buffer health according to an embodiment;

FIG. 9 is a table illustrating video attributes according to an embodiments;

FIG. 10 is a table illustrating further measurements for video streaming QoE management;

FIG. 11 is a table illustrating measurements related to buffer health according to an embodiment;

DETAILED DESCRIPTION

Figure 2:
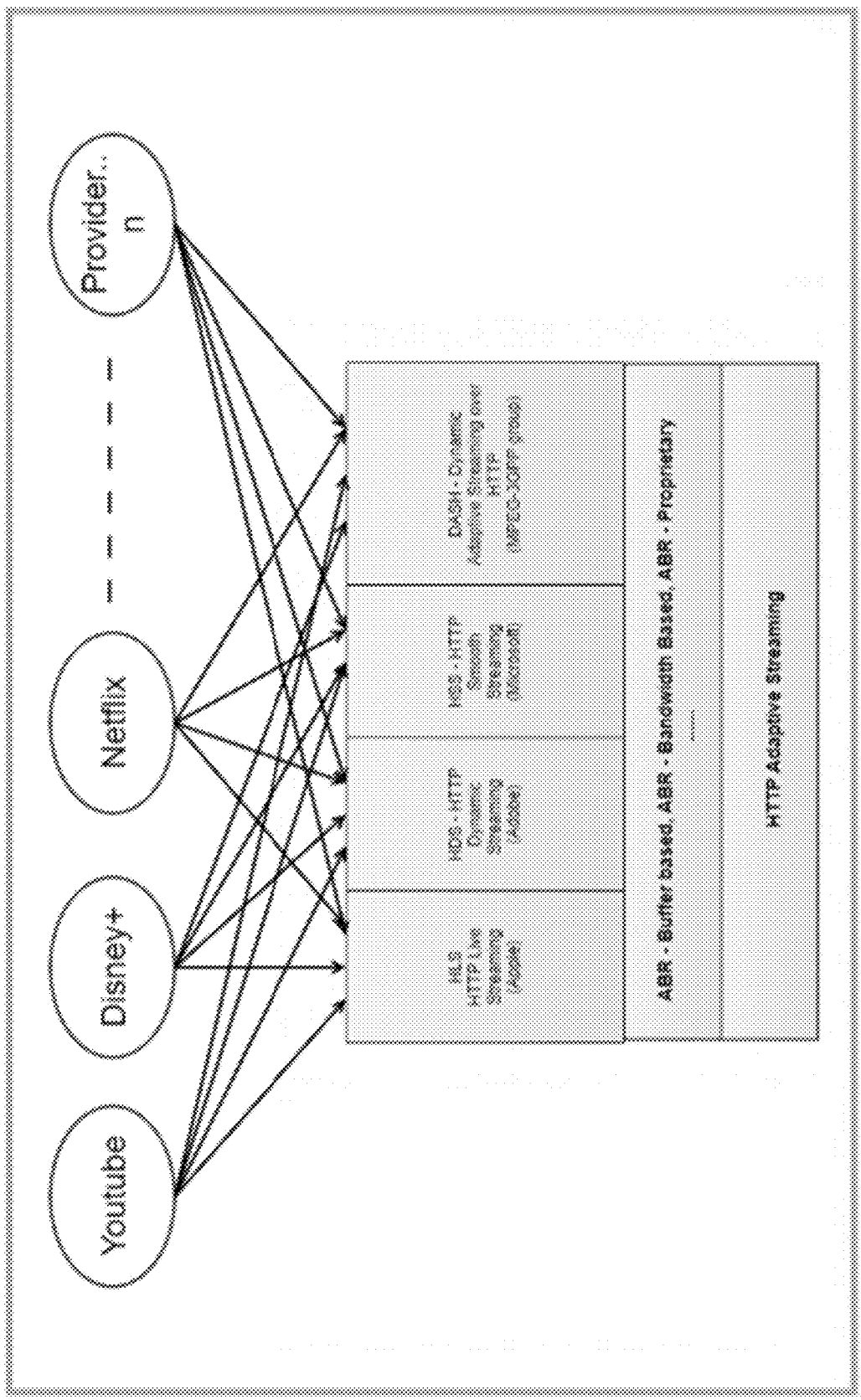
FIG. 2 illustrates the various video streaming providers and the various types of video streaming protocols that may be used.

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a system and method for managing video streaming Quality of Experience (QoE). In some embodiments, the system and method make use of a model to determine attributes associated with video streaming QoE. The model may be initiated or created by the system and method or may be provided from an external source. The model is intended to determine buffer health based on real world user experience as well as consider other video streaming attributes, for example, throughput, latency, and the like. The system and method are intended to use the model to evaluate the video streaming QoE for subscribers. In some cases, a subset of subscribers based on for example, subscriber location, cell site, or the like may be flagged by the system if it is determined this subset of subscribers is experiencing a low QoE. It is intended that the QoE for streaming video may be a value that is aggregated over a plurality of dimensions in order to provide the network provider with data to make network provisioning decisions.

Embodiments of the system and method for managing video streaming Quality of Experience (QOE) are intended to provider operators with real world user experience with video streaming using multiple techniques including machine learning and heuristic processes applied on network health metrics that provides an accurate, holistic view of how users consume video on the internet. It is intended that this holistic view may aid in further understanding the QoE of users of the network with respect to video streaming. The system is intended to work with both encrypted and unencrypted video traffic.

Internet service providers (ISPs) wish to understand how their consumers are watching video on the ISP's network and specifically how good or bad the subscriber's experience is or will be. The system and method is intended to provide a metric of a Video QOE or Video score. In some cases, the system may provide a score between 1 and 5, with 1 being the worst to 5 being the best experience. It will be understood that different scales such as 1-10, 1-100, 7-22, or the like may be used.

The challenge for understanding Video QoE has been that predicting a QoE score is dependent on a plurality of factors, some of which are easy to measure and monitor, for example, throughput, but other factors may be inherently difficult to measure, for example, buffer health, which also plays a significant part in the overall Quality of Experience. When all of these various factors are added in to the mix, along with the subjective nature of video content preferences across the wide variety of providers, to leads to QoE being a difficult metric to measure, monitor and manage.

The notion of Video Quality or Quality of Experience (QoE) detailed herein is different to what is traditionally understood as Video Quality. Video quality tends to refer to the objective quality of the video signal itself, measured using techniques such as PSNR (Peak Signal to Noise Ratio).

The Quality of Experience on the other hand may be defined as a degree of delight or annoyance of the user of an application or service. QoE results from the fulfillment of the user's expectations with respect to the utility and/or enjoyment of the application or service in the light of the user's personality and current state.

Embodiments of the system and method detailed herein aim to provide a Video QoE score that is content provider agnostic (in that the system and method are configured to work with a plurality of video providers, for example, Youtube, Netflix, and the like), and device agnostic (the system and method are configured to review a plurality of devices, for example, Personal Computers, laptop, handheld devices, Smart TV, and the like). Further, embodiments of the system and method are configured to determine a QoE of the video content using both network indicators and user experience. In some cases, the system may provide a score between 1 and 5, where 1 represents bad QoE, and 5 represents excellent QoE. In some cases, the method may be on the Absolute Category Rating (ACR) scale. The labels on the scale may be "bad", "poor", "fair", "good" and "excellent", and may translated to values 1, 2, 3, 4, and 5 to calculate the Mean Opinion Score (MoS).

The system and method provided herein are intended to aid the internet service provider to effectively operate and manage their network while offering a high level of customer satisfaction and provide flexibility in offers to their subscribers.

Typical approaches to estimating Video QoE have tended to be centered on one of the endpoints, for example, the client or the server. These conventional approaches tended to focus on estimating Video QoE to facilitate best video quality service at the client endpoint (for example, based on the device type, PC, handheld device, or the like).

Embodiments of the system and method disclosed herein are intended to enhance previous solutions by incorporating further factors, for example, stalling behavior, into the QoE metric, as it has been noticed that stalling behavior has a lasting effect on QoE. Further, the system and method are intended to deliver a result as defined on an industry standard scale, for example, the ACR scale of 1 to 5.

Embodiments of the system and method are intended to determine the type of device that the consumer is using to watch the video. The type of device has been determined to have a significant influence on the user's experience while watching the video. For example, watching a video in 480p resolution may be acceptable on most common smartphones, the same video at 480p may not be acceptable while being viewed on a 55 inch television screen even if the video plays flawlessly. The system and method detailed herein are intended to address this issue by considering the device types and/or screen size and use this information as one of the plurality of factors in the estimation of the overall QoE.

The system or method for determining the QoE of streaming video are intended to be deployed in a middleware or DPI environment and may review both encrypted and non-encrypted data. In some cases, the resulting or overall QoE may be presented as a number on ACR scale (1-5). The system is configured to determine the QoE value based on a plurality of factors or Key Performance Indicators (KPIs), for example, Buffer Health, Video Resolution, Throughput, Device Type, Subscriber Engagement, and the like. The system may determine Buffer Health and Resolution, which have been shown to be important indicators in determining the QoE.

Video streaming over the internet has come a long way from progressive streaming to adaptive streaming, which is more prevalent in recent times. FIG. 1 illustrates differences in various streaming technologies.

Hypertext Transfer Protocol (HTTP) Adaptive Streaming (HAS) has evolved to be the primary methodology to carry streaming video. The majority of streaming video technology incorporates some kind of adaptive streaming behavior. These include, for example, HTTP Smooth Streaming, HTTP Live Streaming, and HTTP Adaptive Streaming. Although the basic design and working principles of all the three versions are comparable, each one of them has an independent implementation of HAS and also use their respective players, for example, HDS supports Adobe Flash player, HSS supports a Silverlight player and HLS works with the QuickTime Player.

To avoid fragmentation in the market, the Moving Picture Experts Group (MPEG) together with the 3rd Generation Partnership Project (3GPP) started working on HTTP streaming of MPEG media and HAS, respectively. These efforts eventually resulted in the standardization of Dynamic Adaptive Streaming over HTTP (DASH). Video content may be served using any of the above methods, but overall, DASH seems to have become the de-facto standard in streaming video, primarily because of widespread interoperability across devices, browsers and codecs. Further, many of the popular video providers use HAS as the underlying framework for serving video. Depending on the client side platform, they may choose to use one of DASH, SS or HLS.

It has been noted though that HLS was primarily used for (Over the Top) OTT apps on IOS platforms. DASH has been used for PC and Android based systems. SS has been used for TV. Most HAS solutions integrate the bitrate adaptation logic inside the HAS client, since this allows the client to select a bitrate level independently and may avoid the requirement of having intelligent devices inside the network infrastructure. Embodiments of the system and method detailed herein are intended to use HAS as a base, while building on theories and applications to determine video QoE. It will be understood that similar principles will apply to other streaming technologies.

Since end-to-end network bandwidth fluctuates over time, adaptive bitrate controllers are generally implemented at the client side to estimate network bandwidth, request video at appropriate bitrates and optimize tradeoffs associated with QoE metrics and streaming bitrate. An application-layer Adaptive Bitrate (ABR) method determines the quality of the next segment that a client should request.

FIG. 2 illustrates a relationship between various video providers and the technology stack. Most ABR methods rely on at least some of the following factors to guide the selection: Bandwidth based; Buffer size; Mixed/hybrid scheme; Proprietary scheme, Markov Decision Process (MDP) based solutions and the like.

It will be understood that at the start of a video playback, an end device or client will download a DASH Media Presentation Description (MPD) file. All of the data the device requires to pull the video, which includes the audio and video segment file information tends to be found in this file. The client sends HTTP requests to fetch segments one after the other at a certain rate. The Adaptive Bitrate (ABR) method decides the number, encoded quality and frequency of the next segment which may be required for optimal playback.

A factor considered by the system and method is video buffer and in particular, the health of the video buffer. The downloaded video segments are stored in a client-side application buffer, which is often referred to as a video buffer or buffer. This buffer is a piece of read/write memory that is used to maintain continuous video playback. Once the size of the buffer is higher than a certain threshold, the video can be played. If the size of this buffer falls below a certain threshold, and the video has not finished, then the client will see a buffer stall. The general status of the playback buffer, in relation to the likelihood of stalls occurring, or conversely, the status of the buffer in ensuring a smooth playback is referred to as Buffer Health. The ABR method employed decides the thresholds, and decides whether to switch up or down the resolution of the video to ensure continuous playback.

Video resolution is another factor considered by the system and method detailed herein. Video resolution refers to the pixel density—the number of pixels per unit distance of area on the screen. Also known as Pixels Per Inch, video resolution is often used as an indicator of video quality—the higher the number, more pixels per inch is able to be shown on a screen. This is particularly relevant for large screens (greater than 40 inch screens), but may be less of an issue for smaller screen. Although a large number of resolutions are possible, they may be broadly classified into the following:

Standard definition (<720p)—There may be multiple categories in SD—including display resolution of 640×360 also known as nHD and display resolution of 960×540 also known as qHD.

High Definition (720p) Resolution of 1280×720 pixels

Full High Definition (1080p) Resolution of 1920×1080 pixels, which is 50% larger than HD.

Ultra High Definition (4k) Resolution of 3840×2160 pixels and is double the size of FHD.

It will be understood that as time progresses, further standards of video resolution may be introduced and may then be added as a category for the system and method detailed herein.

In cases where a video starts playing at a certain resolution and in the middle of playback shifts to a higher resolution, this is generally referred to as an up-shift. For example, when a video starts, the networks conditions may be worse than normal, but during the time the video is streaming, if the bandwidth available increases, then the ABR method on the client device will often be configured to fetch the next few segments in a higher resolution. The converse of this is a down-shift where a video resolution goes down a level because the network conditions may have worsened resulting in the connection quality worsening.

Another factor that is considered by the system and method is throughput. Throughput or network throughput is the rate of transmission of packets over a network, measured in bits per second. This is one of the most popular and easy to measure indicators of network quality. A number of conventional tools are available in the public domain to measure throughput. It is intended that the throughput measurement be separate from the bandwidth, which is a measure of the number of packets that can be transmitted over a network. In other words, bandwidth indicates capacity of a system to transfer packets, throughout is a measure of how many packets were actually transferred in a period of time. A number of tools are available in the public domain to measure throughput.

Embodiments of the system and method may further consider the device type. Device type may refer to one of the following:

Handheld device—smartphones and tablet PC. Any type of device that is held in the hand for a majority of the time.

PC (Laptop, Desktop computers that run an operating system like Windows, Mac or some flavor of Linux)

Smart TV—typically devices that display video over large screens. Includes gaming consoles (Xbox, Playstation, and the like) and digital set top boxes like the Apple TV, Android based TV, and the like.

It will be understood that other device types may be included, but for the purpose of this illustration the device types may be based on the above categories. The reason for having this factor is that it is intended to illustrate the difference in perceived video quality with respect to screen size. Watching a video on a smartphone is a very different experience compared to watching the same on a large TV. A lower resolution (SD) video may be acceptable on a smartphone leading to a good QoE, but may not result in the same level of QoE on a larger screen. Generally, the smaller the screen, the lower the hardware and software requirements on that device to enable video playback. This in turn affects the network KPIs that may determine the QoE.

Embodiments of the system and method are intended to have the ability to accurately predict video quality of experience agnostic of at least the following variables;

Video provider: Including but not limited to popular video services like Youtube™, Netflix™, Disney+™, and the like Device type: Devices covered may be smart phones, PC, Smart TV, gaming consoles, chromecast, set top box equivalents, and the like, Access network: Including Fiber, Cable, Mobile, Satellite networks, and the like.

Further, embodiments of the system and method are intended to have the ability to accurately predict video quality of experience in presence of end to end encryption, based at least in part on the model build by the system. The system may be configured to provide for defining buffer health based on the concept of time elapsed versus real time. Embodiments of the system and method are intended to have the ability to provide a realistic video score that reflects the quality of experience at periodic intervals using the time distributed model. For example, if a video is 10 minutes long and out time step of prediction is 2 minutes. This means a prediction may be made every 2 minutes of video playback. In some cases, the first 4 minutes may provide for an excellent QoE (score 5), the next 2 minutes may have a very different experience and have a score of 1, and the final 4 minutes ends with score 5, then the final score predicted will reflect this over time (5, 5, 1, 5, 5).

Each prediction made will be for that specific time step and may also incorporate the behavior seen for the previous minute and the context of video scores from the beginning. This may be accomplished by, for example, a Deep learning model. In a specific example, the feedback mechanisms used may be the LSTM (Long Short Term Memory) learning model. As the collected data has a time element on a z-axes (as detailed herein) as well as a concept of gates, the system is intended to incorporate context into the predictions. A common LSTM unit is composed of a cell, an input gate, an output gate and a forget gate. The cell remembers values over arbitrary time intervals and the three gates regulate the flow of information into and out of the cell. Other learning models may also be used by the system.

Embodiments of the system and method are intended to extend the model network to cater to new services and other types of video traffic in a manner that is low cost (in terms of time and work required) and with no service impact to the system (and network where the system is deployed).

Figure 3:
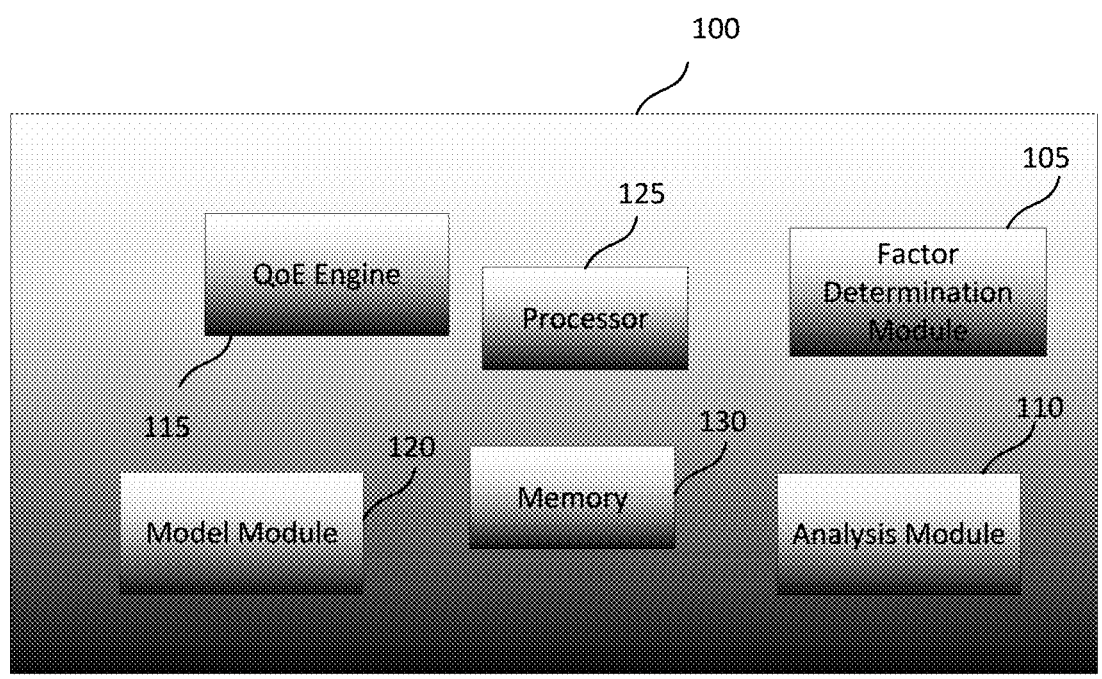
FIG. 3 illustrates a system for managing video streaming QoE according to an embodiment.

FIG. 3 illustrates an embodiment of the system 100 for managing video streaming according to an embodiment. The system 100 includes a factor determination module 105, an analysis module 110, a QoE engine 115, a model module 120, a processor 125 and memory 130. In some cases, the system 100 may include a plurality of processors, for example, including at least one processor per module or per engine. In some cases, the factor determination module 105 may be associated with a deep packet inspection engine. In some cases, the analysis module 110 may be associated with or operatively connected to a packet processor engine. In some cases, the system 100 may be distributed and may be housed in a plurality of network devices. In other cases, the system may reside in a single network device. The system 100 is intended to generally be inline with the traffic in order to receive and analyze packets in the traffic flow. In some cases, the memory 130 may be included as an internal component of the system. In other cases, the memory component 130 may be housed externally or in a cloud and may be operatively connected to the system and the components of the system. Generally speaking, the system is intended to reside on the core network but could also be in separate ISP networks.

The factor determination module 105 is configured to receive or retrieve traffic flow data by, for example, deep packet inspection. The real-time data records are intended to include data associated with video streaming traffic flows, including flow attributes and device properties as detailed herein. From the data records, it is intended that the factor determination module 105 may determine factors associated with the QoE model associated with the system. The factor determination module 105 may be configured to aid in determining factors for the model initiated by the model module 120.

The analysis module 110 is configured review the data records and flow attributes to gain insight into the QoE of the subscriber streaming the video. The analysis module 110 may further be used in determining a model to analyze the QoE score, as detailed herein. In some cases, the analysis module 110 is may determine a video stream factors, for example, throughput, resolution, buffer health, and the like, associated with the video stream traffic flow. The analysis module 110 may receive measured data from the factor determination module 105, or may retrieve the data from other various sources.

The QoE engine 115 is configured to calculate the QoE score based on the analysis of the analysis module 115. The QoE score may be determined based on various factors and the model associated with system and model module 120. The QoE engine 115 may further be configured to export or otherwise notify an ISP of the determined QoE score. In some cases, the QoE engine may suggest or implement traffic policies or actions based on the determined QoE score or an aggregate of the determined QoE scores. In a particular case, if the QoE engine determines a subscriber location with lower than acceptable QoE, the QoE engine may provide for the increase in priority of video streaming traffic in that location.

The model module 120 is configured to determine a model with which to analyze the current QoE score of the network and the subscriber's streaming video for an ISP. The model may be stored in a memory component, and the model module 120 may create the model as detailed herein.

Figure 4:
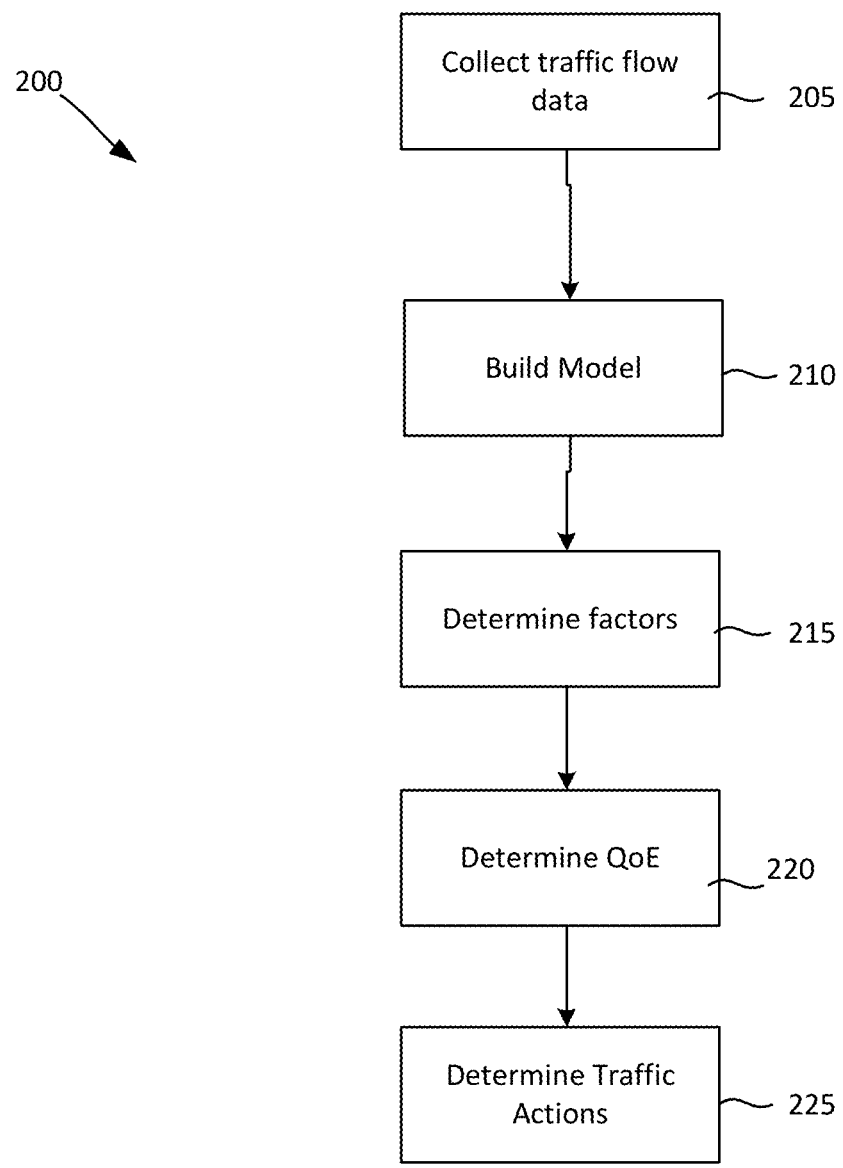
FIG. 4 illustrates a method for determining video buffer health according to an embodiment.

FIG. 4 illustrates an embodiment of a method 200 for managing video streaming. The factor determination module 105 may collect or receive video data at 205. The model module 120 may then build and validate a mode to be used to determine the QoE for subscribers streaming video, at 210, as detailed herein. The factor determination module 105 may then further collect factors regarding the video stream flow, at 215. At 220, the model may be used to determine the QoE score of the streamlining video. After the QoE score is determined the system may export the QoE score or provide other traffic actions that may be used to improve the QoE for the subscribers of the network.

The QoE engine 115 may determine a QoE score based on the model stored by the system. The QoE engine may then store a result or may suggest or implement action based on the score. It will be understood that the QoE engine may run continuously, or may be performed at predetermined intervals for a video stream traffic flows. In some cases, the QoE score of a plurality of subscribers may be aggregated by the QoE engine over a particular dimension, such as location, device type, or the like or a plurality of dimensions of interest for a network operator.

The system, and in particular the analysis module, is configured to analyze various factors influencing the Video QoE. The outputs of each of the factors are then used to determine an estimate the final QoE as a score. In particular, the system may concentrate on Buffer Health Estimation, Video Resolution, Throughput and Device Type, although other factors may be used in determining the QoE and in building a model to be used in determining the QoE.

The Video score that is determined can be informally interpreted using the following map/scale and related definitions representing some of the factors. It will be understood that other scales may be used and that other factors are involved in the QoE score.

| Video QoE Score | Definition/meaning |
| --- | --- |
| 4-5 | No stalls, Clear resolution |
| 3-4 | Minor stalls, mostly clear resolution |
| 2-3 | Considerable stalls and/or lack of clarity in resolution |
| 1-2 | Considerable stalls and/or lack of clarity for majority of video playback |

The health of the video playback buffer (buffer health) is a factor that aids in determining the overall quality of experience for a user. This is because the presence of stalls—either at the start of the video or during the course of playback is seen to be an unpleasant part of the video watching experience, with all else being equal. This is applicable more since a large part of the videos are watched on handhelds and usually in mobile networks that may not always guarantee a strong connection. For other device types, for example, PC and TVs are generally used in a home or office setting, which usually comes with a more reliable and/or faster Internet connection.

In some cases, the QoE engine may determine to modify network conditions in the case of video degrade. A key part of the data collection exercise to build a model for the system is to arrive at a set of network policy actions to effectively represent a degrade or impair a network that can lead to buffer stalls with varying intensities when videos are played. In building the model, the system may artificially create these conditions in order to obtain information regarding lower and poor QoE. Such a methodology would be designed to have a consistent set of rules that are defined to impair a network such as to degrade video experience in a consistent and repeatable manner, when building the model. This degrade method may be customized across various dimensions, but the end result should be that the user experience of buffer stalls or buffer health would be consistent. The degrade method implemented by the system to build the model is detailed herein.

In some cases, the QoE engine may determine to employ or provide instructions to a traffic throttling device to restrict the bandwidth available for the network to render the video, when creating the model. As the system increases the throttling, the available bandwidth would be reduced, thereby degrading the video and inducing stalls, delays, blurriness, and the like. The throttling device is often referred to as a shaper. While this is effective in reducing bandwidth, it may not be useful in effectively simulating real world conditions like sudden drops and spikes in signal strength, differences while roaming in a mobile network, and the like.

The actions which may be used for this are as follows:
256 Kbps shaper
512 Kbps shaper
Block action
Random Drop action with variable packet drop probabilities
No action In order to build a model for that may be used for estimating video streaming QoE, these actions may be provided in random order. Along with above actions, there may also be times of applying no action in order to simulate real world scenario where at times signal reception becomes better and bandwidth quality improves. Using these actions in random order is intended to provide similarity with real world bandwidth conditions.

The factor determination module may be configured to provide for data collection. Data collection for predicting any type of internet behavior, for example, classification, categorization, or the like, usually involves running a set of pre-defined applications on various types of devices (Mobile, Tablet, Laptop, Desktop, Smart TV, and the like,) and varying network conditions. Data may be collected in the form of capture files (for example, pcaps) and may be processed by running the pcaps through some kind of script or network device that is able to extract relevant data points that will form the data set. In general, data collection for any such prediction/classification task may be done manually (pick video, start capture, play video, add labels, end video, stop capture) or using automation tools.

For the case of video QoE, to prepare the model a set of common applications/video providers (Youtube, Netflix, Amazon Prime, Disney+, and the like) may be used on each user device while the system collected the capture files.

One of the challenges in creating the system and method detailed herein was to create situations where the same video experience (rated on a scale of 1 to 5) may be consistently reproduced to create a model to be used in the estimation of video streaming QoE and to validate the model and results. In creating the module, the system was configured to modify the network conditions so as to effectively degrade the user experience in the form of buffer stalls, delayed starts, blurriness, and the like. This degree of modification of network conditions will be different across each ISP and each of device types.

Another key aspect of data collection is to arrive at a mapping of user experience to network conditions in order to have consistent results. The analysis module of the system is intended to map the actual video duration to realistic playback time for same video, in order to get a consistently reproducible rating of 1-5. In some cases, the difference between time taken for playing a video, relative to actual time elapsed in order to rate the video which will eliminate the need to count stalls being encountered while watching the video. In order to rate videos into, for example a 1 to 5 rating, the following may be used:

$$Tdiff = Tc - Tv$$

where, Tc is the real time in seconds since the video was started; Tv is the Time for which a video was played, as indicated by the player; and Tdiff is the difference indicating how much the video playback time is falling behind in relation to real time. Although seconds are used in this example, milliseconds or other measurements may also be used.

This time difference may be calculated throughout the duration of the video playback. At each instance where the system may take a sample of a predetermined time interval, for example 1 second, 2 seconds, 5 seconds, 10 seconds or the like, and may store or otherwise log the Tdiff. As this difference increases, this implies the buffer health deteriorates.

In a specific example, for a 60 second video, there may be an initial start delay of 2 seconds, and 1 stall of 1 second, then the overall Tdiff would be 60+2+1=63 seconds.

In another example, if there was a start delay of 1 second, and 2 stalls of duration 3 and 4 seconds, then the Td would be 60+1+3+4=68 seconds.

Hence this method can be used to measure and map the different aspects relating to buffer health, namely:
Start time
Buffer stall count
Buffer stall duration Therefore there may be a Tdiff used to map actual buffer health.

In a particular example, a Youtube video of 8 minutes on a Windows laptop may be reviewed. FIG. 5 provides an illustration of the video progress bar of the example video. As the length of the video is known, the application playing the video may determine the actual length it took to view the video. Further, the system may evaluate further factors at predetermined thresholds, for example, every 5 seconds. In particular, FIG. 6 illustrates an example timestamp log that includes the differences between the Tc, time of the video playback, and Tv, time the video was playing. At the end of the video, the system may determine the final difference.

For an 8 minute video with data logged every 5 seconds, 96 instances of Td for the video may be recorded and the system may determine an overall difference of 4 seconds. In other words, a video of 480 seconds was played out in a time of 484 minutes. During the video streaming the system is further configured to collect and store traffic flow data, for example, throughput, bandwidth, or the like.

Figure 7:
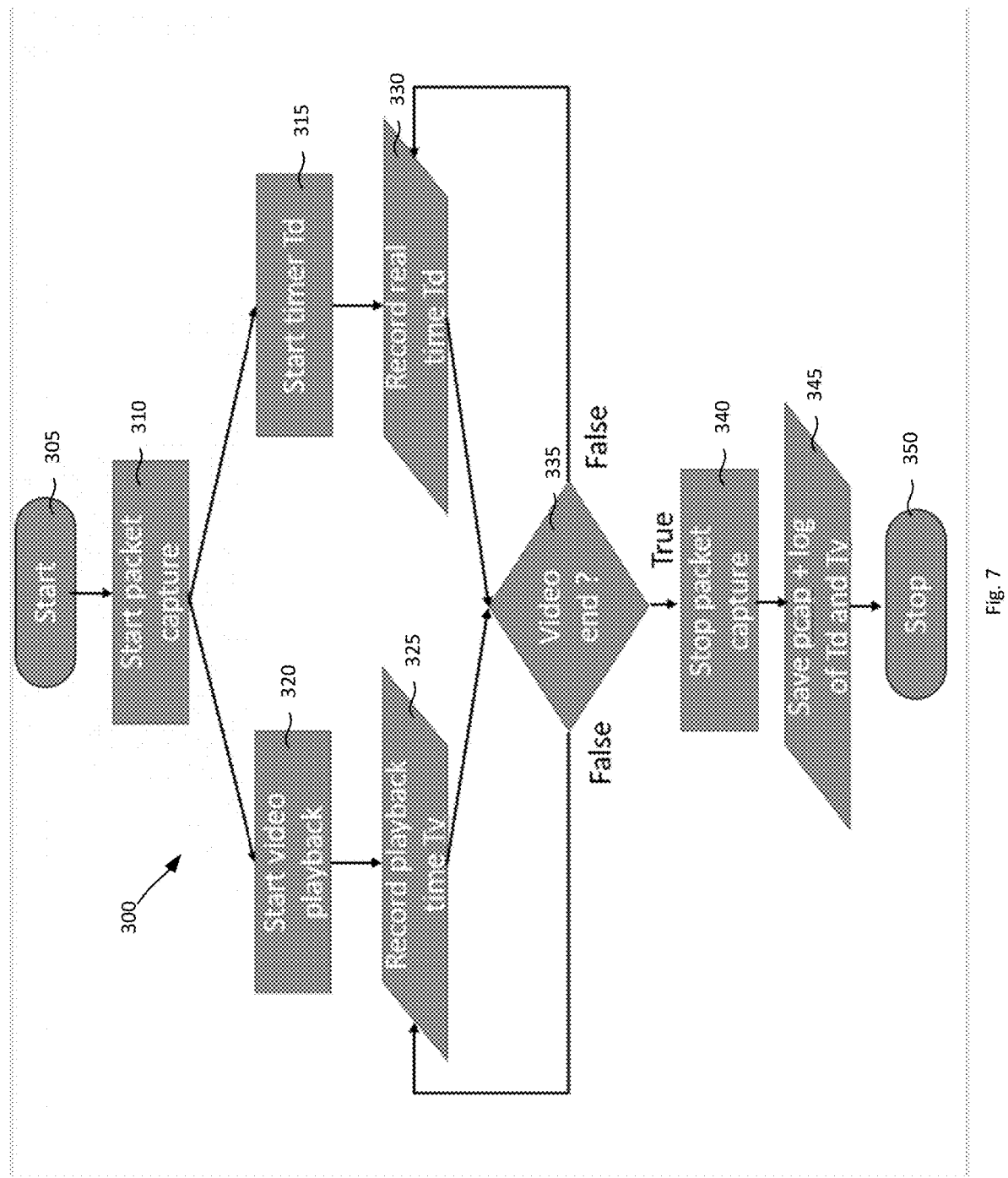
FIG. 7 illustrates a method to generate and log data according to an embodiment.

FIG. 7 illustrates a method 300 to generate and log the data for the model. The video stream will start, at 305, and the system factor determining model may begin to capture the packet data or traffic flow, at 310. The system is intended to being the timer, at 315 as the video playback begins, at 320. At the end of each predetermined interval, the playback time Tv, at 325, and the real time Td, at 330, will be recorded. It will also be determined whether the video has come to an end, at 335. Once the video has ended, the packet capture is also intended to stop, at 340. The timestamp log and packet date are saved at 345 and the data collection method is completed, at 350.

Once the data is logged, it may be analyzed to determine buffer health at various time intervals. Each entry in the log file represents a unit of time that is the Td described earlier. To this, the system may add another column Tc, which is a simple arithmetic series with constant 5 added with every instance. This represents real world seconds elapsed Tc. Another column, representing Tv is added, which represents the sum of Td and Tc $$Tv = Td + Tc$$

To this, the system is configured to add a final column representing the buffer health. The value in this column may be filled in on the basis of the following rule set: Procedure map_buffer_health (Tc, Td)

```
start
    If Tv < (1.1 * Td) then return 5
    Else if (Tv <1.3*Td) then return 4
    Else if (Tv <1.5*Td) then return 3
    Else if (Tv <1.8*Td) then return 2
    Else if (Tv > 2.0*Td) then return 1
end
```

At this stage, an example of the data may be similar to the table shown in FIG. 8.

The analysis module 110 is further configured to process and analyze the data collection file or pcap log to use this data to build the model for the model module. The system may then use the model to determine subscriber QoE for video streaming.

In a further example, the buffer health may be calculated based on a different function of real time versus playback time. In particular, another function could use the sum of squared differences as a metric and then map this to a buffer health. As an example the model may consider:

$$Tssd = \Sigma (Tci - Tvi)^2 \text{ where } i \text{ is the time step from 1 to } n.$$

where, Tssd can be another function that can be used to map the time to a buffer health. It will be understood that other functions may also be used. The playback time differences is a property that can be used in various functions to model buffer health.

It will be understood that a traffic flow is a flow between two endpoints, specified as sets of attribute values in the meter's current rule set. A flow is completely identified by its set of endpoint attribute values. Each flow may also have values for computed attributes (Class and Kind). These may be directly derived from the endpoint attribute values, via the factor determination module 105.

A new flow is created when a packet is to be counted that does not match the attributes of an existing flow. The system is intended to record the time when this new flow is created. Attribute values are set when the system sees the first packet for the flow, and are never changed.

Each flow is intended to have two packet and two byte counters, one for each flow direction (Forward and Backward). These are updated as packets for the flow are observed by the system. The attributes are intended to have a similar meaning for a variety of protocols (for example, TCP, UDP and others). Flow attributes may be static or are continuously updated counters over the lifetime of the flow. Flow attributes are designed such that they are not reset.

The system is intended to use Flow Attributes mentioned and a set of derived attributes which are derived from the inter relation of the Flow Attributes to each other as well as to other attributes of the network. The derived flow attributes offer a way to infer flow properties that are not altered by the time at which the flow measurement was taken (in other words, it is not tightly coupled to the age of the flow at any given point in time) and when used in conjunction with other derived attributes and standard flow attributes offer an accurate source of data which is believed to describe flow behavior in a statistically predictable and repeatable manner.

The total set of attributes available including the various derived attributes, number in the hundreds and will not be listed in their entirety in this disclosure. Flow attribute measurements can be made in both directions for bi-directional traffic flows, if necessary.

The non-derived attributes can generally be grouped or categorized into the following categories:

Packet timestamp—A relative timestamp that starts from 0 to indicate the beginning of the flow and video.

Packet Length attributes—Flow attributes related to packet length information including, for example, IP length related statistics among other parameters.

TCP stack attributes—Flow attributes related to TCP stack parameters. These attributes are only applicable for TCP traffic and include for example TCP Window Size statistics among other parameters.

Activity related attributes—Flow attributes related to how active or inactive a particular flow is. These may be fetched from analysis of the timestamps in successive packets over a time interval Synchronization and consistency attributes—Flow attributes related to synchronization, re-transmissions and fragmentation of packets belonging to a particular flow.

Temporal attributes—Flow attributes related to time, including statistics regarding the age of the flow, inter arrival time between packets of a flow and other temporal statistics.

Usage attributes—Flow attributes related to usage measured in bytes and packets.

Burst profile—Statistical variability in packets received and sent over a specific time interval.

The data collection or pcap file is intended to contain a snapshot of all network activity from the time of start of capture to the end. The system is configured to analyze this file by processing it using, for example common tools or libraries, such as, libpcap, scapy, tshark, or the like. The per packet data may then be aggregated to form a single record per second. The aggregation may be done using the timestamp present in each packet of the pcap. The system is intended to first filter all relevant flows (for example, youtube, Netflix and the like). Then the system may line up each of the packets along their time stamp and then proceed to calculate the metrics as detailed herein.

FIG. 9 illustrates an example data set that may be compiled by the system in building the model. From this dataset, the analysis module 110 may extract one record per time interval, for example, each second, by applications of aggregation methods such as mean, maximum, minimum, variance, standard deviation, or the like. These can be broadly classified as;

Packet Length attributes: aggregations of I5, I4 packet length in one second interval.

TCP Attributes: aggregations of window size, number of packets with psh,urg flags Activity attribute: Aggregations of Active time, Idle time Synchronization attributes: Aggregations of retransmitted, fragmented packets Temporal attributes: Flow Age, aggregations of inter arrival time Usage attributes: Packet counts binned by packet length (1 to 127, 128 to 255 etc)

Burst information: variances in packets and bytes upstream and downstream over time.

In a specific example, the packet timestamp can be converted to a real world time step per second. So the first record starts with 1 and ends with the number of seconds the video lasted. Other intervals may be used.

FIG. 10 illustrates an example data set after some analysis. As the total number of columns at this stage will likely be larger than 100, the data set has been truncated for simplicity. The analysis module may then merge the data collection file with the timestamps log file. In this example, the data collection file has a row every second, whereas the log file has the buffer health labels that represent data for 5 seconds. In this example, the data in the two frames can be merged as an inner join on Time from the data collection dataset. The empty slots in the final data set may be filled with a copy of the data available at the next 5 second interval.

This merge is intended to provide for a buffer health label for every 5 seconds, and provide for enough information in the data collection file to indicate when the buffer health changes. FIG. 11 provides an example of the merged data set. In this case, the labels for the timestamp records are copied where timestamp from pcap data is not a multiple of 5, with the next label available from the timestamp log file. With this dataset and methodology, the system is able to provide for the modelling, evaluation and validation of the buffer health solution.

Many video providers are now making use of a fast start mechanism where the playback buffer may be initially filled as fast as possible to minimize the initial startup time. This fast start mechanism may be manifested in a burst of data at the beginning of the flow. To exclude the effects of this, the first 5 seconds of the data from the overall data set may be discarded and the indices reset to effectively start from the 5th second onwards.

The system is then intended to effectively model the data collection and predict buffer health. From the full dataset available, the analysis module is likely to have hundreds of features available to review. From these, the analysis module may derive additional features using a combination of 2 or more features that may be more important in terms of predictive power. For a simplified example, 2 features are considered as follows:
1. PacketsUpstream_5s—Number of packets seen upstream (client to server) in the previous 5 second interval.
2. PacketsDownstream_5s—Number of packets seen downstream (server to client) in the previous 5 second interval.

The 2 features by themselves may be useful indicators of network quality—higher packet count indicates better connection speed and hence better quality of experience. However, if these features are used to derive additional metrics like a ratio of upstream to downstream packets, this may generalize better across different types of access networks. This better generalization is because in a high speed FTTH (Fiber to the home) a significantly higher packet counts in the same interval may be noticed as compared to a mobile network where the user is moving around multiple cells. Due to the nature of DASH and adaptive streaming, the ratio of the upstream to downstream count is intended to remain same, which is intended to provide for smooth video playback. So, in effect using a ratio may be better when compared to using a raw value of packet or byte counts.

In the same manner as packet count, there could be numerous other derived attributes that can be calculated. These are useful in extracting additional meaning from the raw data. The full set of features available for modelling may easily go into the hundreds. Some examples of derived attributes may be as follows:
1. Ratio of packet size range to total packets.
2. Burst stats including average burst rate,
3. Maximum/minimum/Standard deviation of burst durations,
4. Map of previous N burst rates and duration, and the like.

Once the analysis module has determined a set of raw features and derived features to be used in the model, the analysis module is then configured to perform a feature selection process which iteratively chooses a set of attributes that can be used to build a classification model. The feature selection process is generally guided by the following principles.

Exploratory Data Analysis to understand the data with help of visual devices such as plots and charts to understand how each of the features individually and collectively influence the target.

Confirmatory Data Analysis, also called statistical hypothesis testing: Creating and testing hypotheses on the data to understand how the features influence the data.

Correlations: If any set of features are closely correlated, including them in the final model adds no significant predictive power and so must be selectively dropped to make sure the relevant ones are used. Common methods for this include the Pearson's correlation coefficient, Pointwise Mutual Information (PMI), Linear Discriminant Analysis (LDA), Chi Square test, and the like.

Wrapper based methods: Use a search algorithm to find the optimal subset of features among the full set.

Embedded feature selection methods: Model specific feature importance to the model.

Shapley values to understand feature importance and provide for further explanation to the model.

Once the analysis module has determined a preferred set of features the system is configured to explore different types of statistical models that may be used to predict the Buffer health. A number of machine learning models were explored in the model selection phase, and it was determined that Artificial Neural Network called Long Short Term Memory (LSTM) appears to create an appropriate model. Other methods may be used. The LSTM method was selected because of the time dependent nature of the video playback. Unlike other classification problems, the analysis of buffer health may not have a fixed set of inputs and target to predict. Instead, there may be multiple inputs over time and the goal is to predict the key indicators (buffer health) at each interval until the end of the video.

For this example, a time interval of 5 seconds may be selected, each prediction will have to reflect the best representation of buffer health or video quality for the previous 5 seconds, and also include some context on the previous interval, the one before and so on. This is because the video buffer is constantly filling and emptying based on how the ABR serves up content. Further, the effects of bad buffering tends to have a negative experience in user mind that can exist beyond the duration of the event. For example, if a user is watching a live sporting event or movie, if the buffer health deteriorates in middle of a crucial game play or movie scene, and results in a buffer stall, the effect of this stall on user lasts longer than the event itself. The buffer might get filled up again in a five seconds, but the event (and negative experience associated) lasts with the end user for longer than five seconds. Hence it is important for a system and method for estimating QoE for video streaming to incorporate not just events in the immediate past, but also include some history of previous events and their effects. Hence the choice, in this example, of using the LSTM to build the model because this method includes the time element as a third dimension. LSTM has been shown to be able to successfully model complex time based variations. The Gated Recurrent Unit (GRU) is another type of RNN that may be used for to create a model.

The LSTM is a type of Recurrent Neural network which is used to process sequential data, where entities occur in a particular order. In this case, the order is time based. This additional time dimension means that the data can be considered to have 2 dimensions—the first one being the depth of the neural net (rows and columns) and the second being the time. So the outputs of a single data point, are to be stated for the time t.

Figure 12:
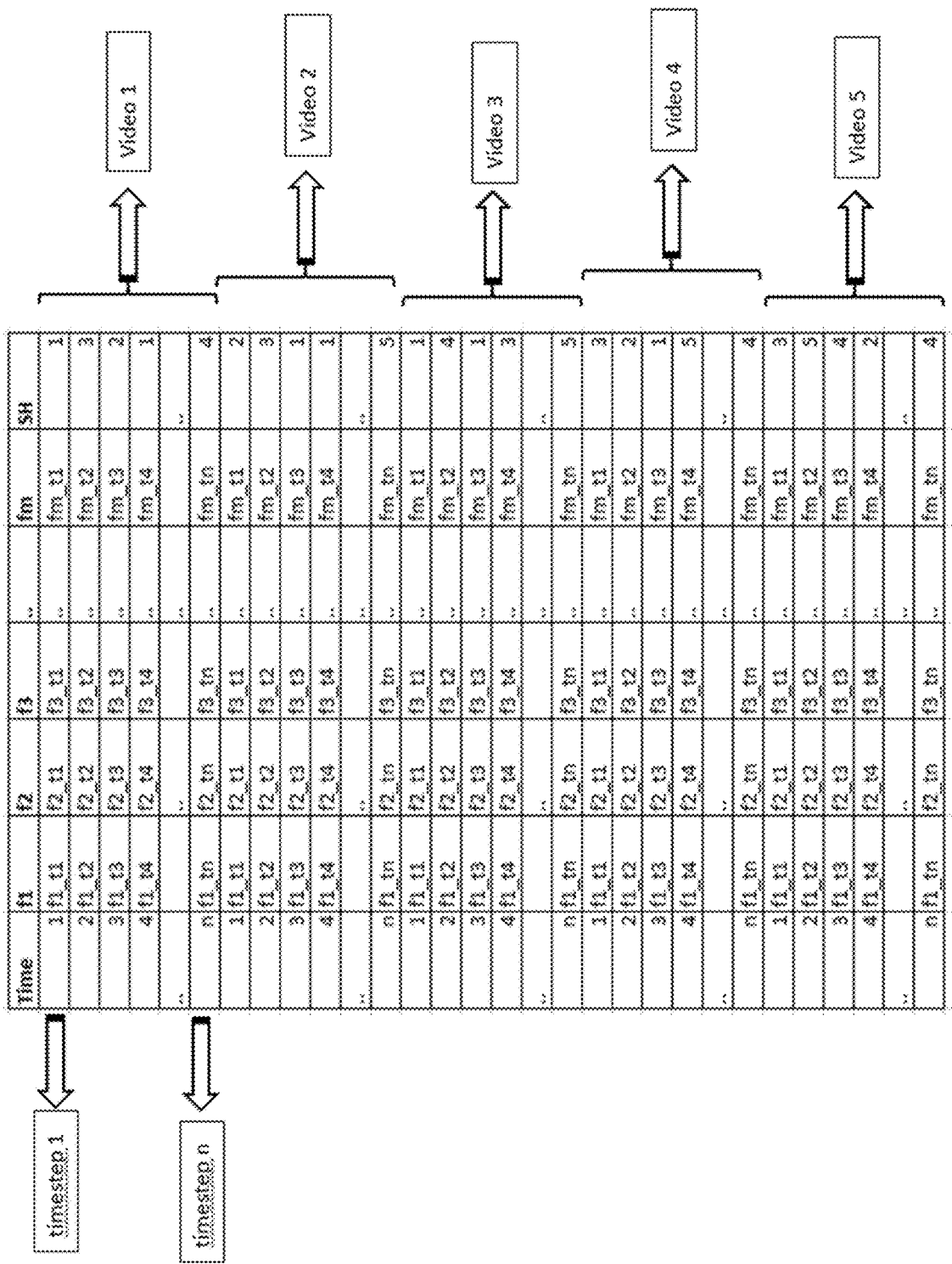
FIG. 12 illustrates various time steps for a plurality of video streaming flows.

The LSTM is configured to add an explicit memory unit (cell state) which stores information relevant for learning some task. It also adds a gating mechanism to regulate the information passing through the cell. With the addition of the time dimension, the model module is configured to map the dataset. The dataset is intended to have been indexed on time, and has a plurality of records, one for each video played. A representation of the dataset is shown in FIG. 12 prior to the transformation. In this sample, the dataset has 5 videos, with one row of data each for each second, and each video lasting n seconds. There are m features in each row.

Figure 13:
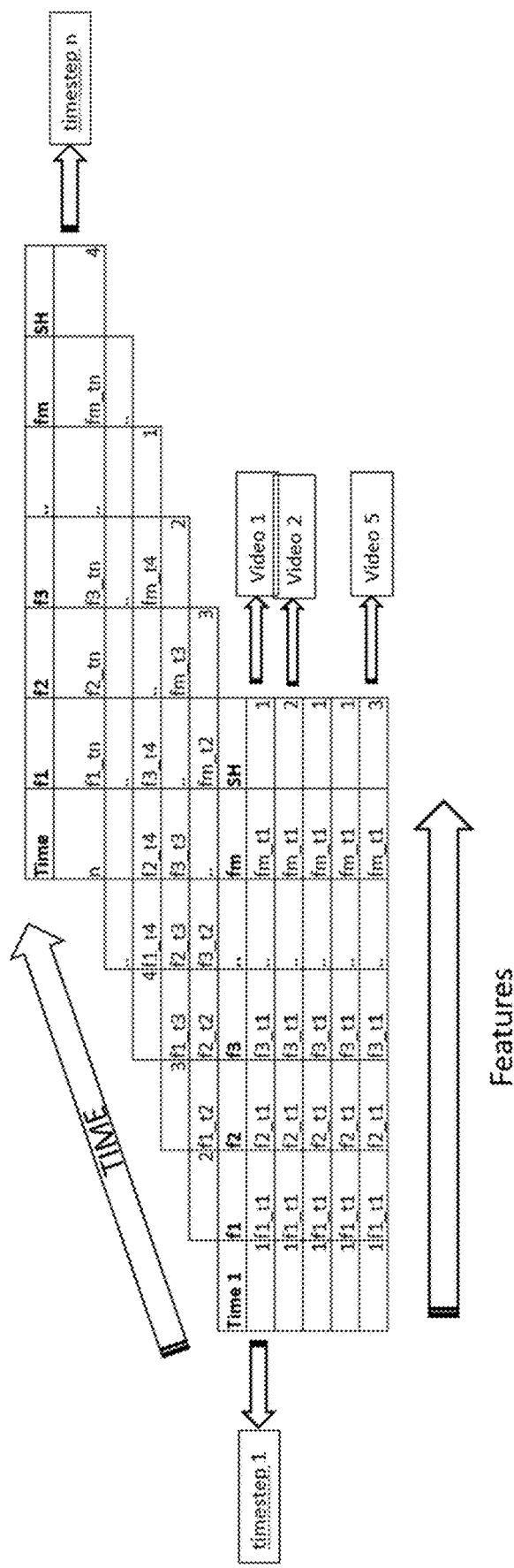
FIG. 13 illustrates a table of a plurality of video streaming flows over time for a plurality of features.

As the LSTM requires the time dimension to be mapped separately, the dataset of FIG. 12 will be transformed. FIG. 13 illustrates the dataset after adding the time dimension.

The LSTM model itself may be built using one of the common machine learning libraries, for example, tensorflow, pycharm, theano, or the like. Typically the architecture of the model, also known as the LSTM network will be a series of layers starting with the Sequential layer, one for the LSTM itself, with multiple Dense and Dropout layers and the final layer being specified as the Time Distributed layer. The gradient descent method may be used for the optimization process, and may be combined with backpropagation through time to compute the gradients. The weights at each layer may then be changed relative to the derivative of the error at each output layer. Appropriate configurable parameters to the network, such as number, size and type of layers, choice of loss function, activation functions, optimizer, validation metric, number of epochs and so on may be added as well. With the set of hyperparameters and collected data, it is intended that system is configured to provide for about a 90% accuracy with this model. The model files may be exported using an appropriate library and shipped to the deployment system. Hyperparameters are configurable options for the model itself (for example, number of layers, nodes, epochs, and the like).

Figure 14:
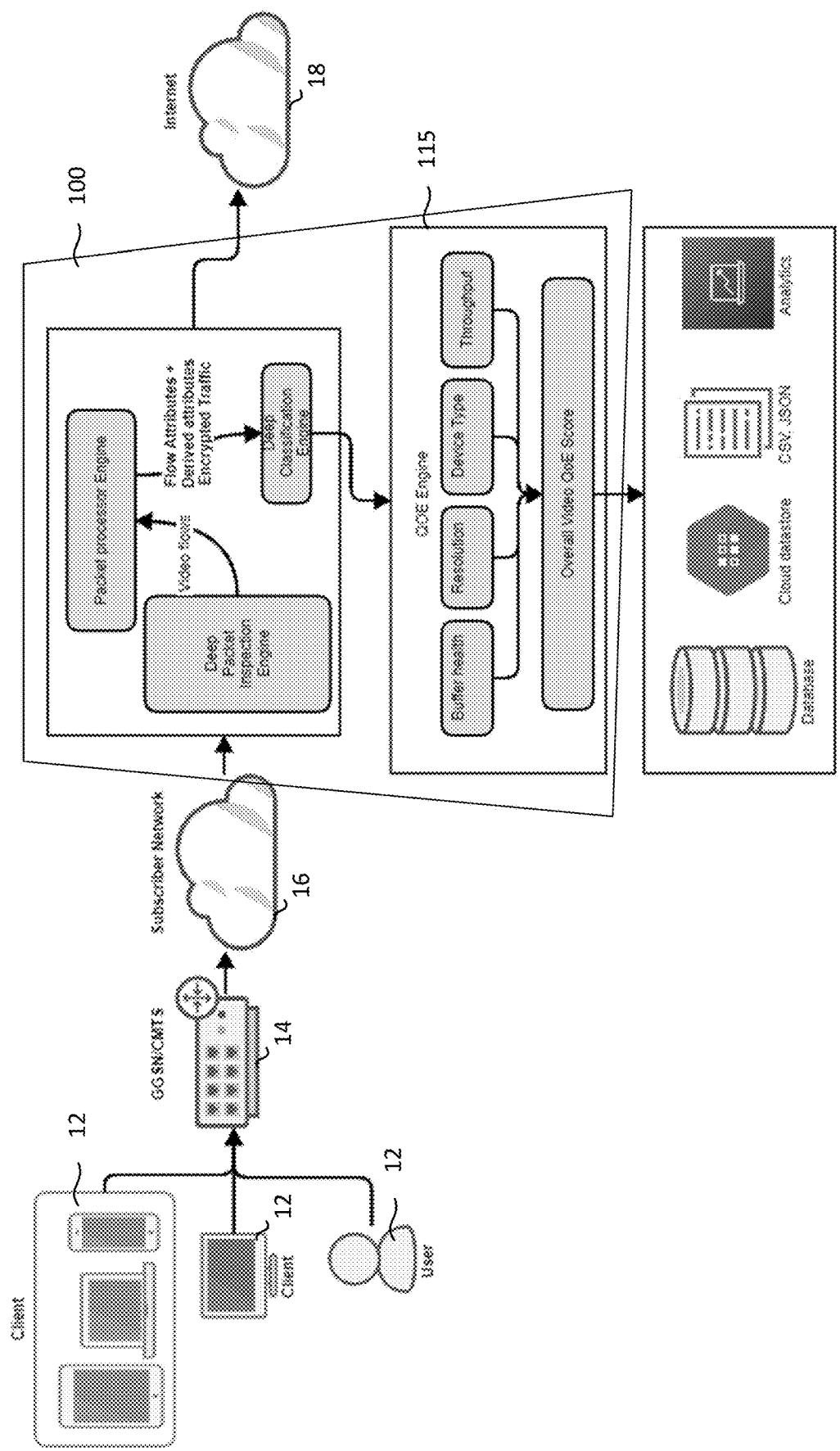
FIG. 14 illustrate an example environment for the system for managing video streaming QoE.

A typical deployment of the system and the overall schematic is shown in FIG. 14. Once the model has been built, a subscriber, 12 will access the subscriber network 16 via, for example, a CMTS 14. The subscriber's network will further interact with the Internet 18 in order to provide the subscriber 12 with the requested content. The system will process the packet, including providing DPI, for example via the factor determination module, and analyze, via the analysis module 110 the flow attributes and derived attributes. The analysis module will determine data relevant to the QoE factors. The QoE engine is configured to determine the QoE based on the model including, for example, buffer health, video resolution, device type and throughput. The QoE engine is further configured to provide the analytics to the ISP or store the analytics in, for example a database.

The system is further configured to estimate the video resolution. The video resolution (also sometime referred to as display resolution) is the density of distinct pixels in each dimension that can be displayed. The resolution of a video is closely correlated with the bitrate or the throughput of the connection. The output of video resolution prediction may be one of SD, HD, FHD and UHD. Various methods may be employed to estimate the video resolution, ranging from simple heuristic methods to machine learning models. Since the resolution is closely tied to throughput and does not have as much of a temporal element as the buffer health, the system may use a relatively simple decision tree that can be used to estimate resolution.

Data for predicting video resolution may be collected using similar principles as done for buffer health, although, data related to real time and video play time may be ignored. Generally, video providers have some indication of the video resolution on the screen or in a hidden menu. In some cases, the system may be able to determine this indication. For the case of video resolution, the following may be a sample method to collect the data file or pcap.

The system may initially allow all resolution configurations to 'auto' or default. This is intended to ensure that any upshift or downshift in resolution is based off the network action applied and not from the ABR method. Once the video has started playing, the system will capture the packets and determine the network modification action. Once a mix of network policy action that results in a consistent video resolution as seen on the device screen. In order to build a model, it is intended that data will be collected over an extended interval, for example, 15 minutes, 20 minutes, 30 minutes or the like, where the resolution does not change.

Once the data has been captured, it may be labelled with the appropriate resolution. For example: Youtube_android_720p.pcap. This implies all the Youtube flows in the pcap are ones with resolution of 720p (HD)

The system may then also predict future video resolution, if required or requested. From the collected data, the following statistics may be obtained using packet processing tools such as scapy/tshark. All of the statistics are fetched at a sampling rate of, for example, one value per second although this time interval may be amended. Predictions for final resolution may be made at the rate of one prediction per 5 seconds, for example, although other time intervals may be used. As with buffer health, the data from the initial start phase, for example the first 5 seconds, the first 10 seconds or the like may be remove to remove any outliers that may be the result of the fast start mechanism that may be implemented by some video providers. In some cases, the factors that may be reviewed are as follows:

Throughput downstream—the number of bits per second received at the client device, represented by Tp Client bitrate—rate of bits transferred from the client device to the server Throughput to client bitrate ratio: a simple ratio of throughput to Client bit rate.

Moving average of Throughput to client bitrate ratio: A simple average of a predetermined number of previous values of the ratio mentioned above and referred to as TCr The following decision tree may be used to calculate the output (resolution of SD, HD, FHD, UHD) from the data collected above;

---

Procedure predict_resolution (Tp, TCr)
start

-continued

```
If Tp > 8000000 and TCr > 105 then return "UHD"
Else if Tp > 1500000 and TCr > 50 then return "FHD"
Else if Tp > 750000 and TCr > 40 then return "HD"
Else return "SD"
end
```

This method of estimating resolution has been found to be approximately 85% accurate in predicting the correct resolution.

The measurement of Throughput may be considered fairly straightforward as it may be determined by the net bytes per second seen on the wire at any time.

Device Type may be determined using a variety of techniques. In some cases, the device type may be determined by analyzing the HTTP user Agent of the payload. In other cases, the system may use a map available with the ISP to identify the device while on mobile networks, for example by using a Type Allocation Code (TAC), International Mobile Equipment Identity (IMEI), or international mobile subscriber identity (IMSI). There may also be a third party tool that may be used to identify the devices on the network.

Once the factors to be used have been determined, the QoE engine may determine a video score, where Video QoE=f (buffer health, video resolution, throughput, device type). Here, f refers to some function (for example, a heuristic function) used to determine the final QoE score. Each of the components may also be used with a weight so as to influence the score in a certain way depending on the deployment type. The weight for each factor may be pre-configured by or based on the model and may be amended (potentially along with the model) from time to time based on the results received from the system and the balance of the traffic on the network. For example, a mobile network and a fixed line fiber to the home network could be configured to treat the device types quite differently. A mobile only network would generally see a majority of devices being smartphones, so it may have a higher weight for the phone device type. A mobile network would also likely have very little traffic coming from Smart TVs and Gaming consoles, so their final weight could again be different.

In one example, the weight values for the resolution may be as per the table below;

| Resolution Percentage Row | Weight |
|---|---|
| SD Percent | 1.5 |
| HD Percent | 3.5 |
| FHD Percent | 4 |
| UHD Percent | 15 |

Further, in the example, the weight for the device-Score may be as per the table below. The values may vary depending on the deployment type and are configurable as per the needs of the deployment.

| Resolution Percentage Row | Weight |
|---|---|
| Handheld | 1.5 |
| PC | 2.5 |
| TV | 4 |

Here is a sample of how the final function for video score might look like. The mapping calculates a vscore using a weighted average of each of the 4 previous metrics—Throughput, Buffer Health, Resolution and Device Type. The Buffer health score is seen as an important aspect to decide overall video score, hence it has the highest weight (50%) among the others. Device Type and Resolution come next with about 20% with throughput score having 10%.

| MetricRow | Weight for vscoreRow |
|---|---|
| throughputRow | 0.1 |
| BufferHealthRow | 0.5 |
| ResolutionRow | 0.2 |
| DeviceTypeRow | 0.2 |

The vScore may then be converted to Final Video score based on, for example, the following ranges:

| vScore value Range | Final Video Score |
|---|---|
| 1.00-1.79 | 1.00 |
| 1.80-2.59 | 2.00 |
| 2.60-3.39 | 3.00 |
| 3.40-4.19 | 4.00 |
| 4.20-5 | 5 |

From the input section the system is configured to receive the data from each of the subscribers in the network, the packets go through a DPI (Deep Packet Inspection) Engine which classifies and categorizes the packets into the application type (Video, Voice, VPN, and the like) and the respective application (Youtube, Netflix, Whatsapp, and the like). The packets may then be reviewed and processed by the packet processing engine where the packet and flow statistics are extracted. These statistics may then be analyzed and forwarded to the QOE engine where various metrics ( ) for video QoE score are calculated (such as the 4 metrics—Buffer Health, Resolution, Throughput and Device Type) Using this information, the system determines a final Video QOE score.

In some cases, once the QoE engine has determined a video QoE score, the system may provide the ISP, via for example a record such as a csv record, a dashboard, or the like, for the ISP to analyze the QoE for video streaming for subscribers.

The system may further provide for data to be visualized or otherwise notify an ISP of areas with the lowest QOE scores for video streaming. This may aid the ISP in identify or resolving a particular issue with the network, which may be addressed via, for example, modifying the switching or routing in a location.

The QoE scores are intended to be associated with other information to identify the flow (Source, Destination IP address, subscriber ID, IMEI, IMSI etc) which may then be forwarded to a suitable output destination. This may be a database, a cloud store, csv files, or other storage that is accessible by the ISP.

In a specific example, the system may be used to pinpoint a location with lower than acceptable QoE. In some cases, FTTH in one location on the network may be generating appropriate QoE while in another location the video streaming QoE scores are significantly lower. This may be flagged by the system allowing for the ISP to address this situation, which may be for example, the one FTTH location is overcrowded and a network update is required, or traffic policies may need to be changed per locations where video streaming QoE scores are low.

In another example, the ISP may wish to compare the video QoE of various service providers, and may determine, for example, that Netflix servers are caching data better than corresponding servers for Amazon Prime. Further, the ISP may be launching it's own video streaming service and may wish to monitor this service and understand where this service may be ranked based on video QoE compared to other services.

The system may also be beneficial in providing for trend reports, determining which video streaming service is rising in popularity as well as provide for comparative and stand-alone quality of buffering for video streaming service providers.

A network provided with the system described herein is intended to have the ability to predict the video QoE. This is intended to provide a video QoE for different types of access networks, device types, type of video provider and in presence of encryption.

Further a network with the system disclosed herein is intended to have a multi-level system (a network) of machine learning models and heuristic methods, each providing an additional layer of visibility into specific video experience.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing Quality of Experience (QoE) for video streaming traffic flow on a network, the method comprising:
    collecting data associated with a plurality of video streaming traffic flows;
    creating a model based on the collected data wherein, creating the model comprises:
        determining a health of a video buffer comprising:
            at predetermined intervals while each of the plurality of video streaming traffic flows plays:
                determining a playback time of a video;
                determining a real time of the video; and
            at the end of the video determining a health of the video buffer score based on a function of the playback time and the real time at the predetermined intervals;
        determining a video resolution score for each of the plurality of video streaming traffic flows;
        determining a throughput score for each of the plurality of video streaming traffic flows;
        determining a device type score for each of the plurality of video streaming traffic flows; and
        determining a weighting associated with each of the scores;
    determining factors associated with a new video streaming traffic flow;
    analyzing the factors based on the model;
    determining a QoE score based on the analysis.

2. The method according to claim 1 wherein the collected data comprises: video buffer health, video resolution, throughput and device type.

3. The method of claim 1 wherein the health of the video buffer score comprises a time dimension where previous buffer health scores at the predetermined intervals are considered at following intervals of the buffer health score.

4. The method of claim 1 wherein the analyzing the factors comprises:
    determining a weight of each factor based on the model; and
    aggregating the weighted factors to determine the QoE score.

5. The method of claim 1 further comprising:
    notifying a network provider associated with the plurality of video streaming traffic flows of QoE scores below a predetermined threshold.

6. The method of claim 1 further comprising:
    aggregating a plurality of QoE scores of network dimensions.

7. The method of claim 6 wherein the network dimensions comprise: location; network type; application type; and application provider.

8. The method of claim 1 further comprising transmitting notification of the QoE score.

9. The method of claim 1 further comprising implementing traffic policies or actions based on the determined QoE score or an aggregate of determined QoE scores.

10. A system for managing Quality of Experience (QoE) for video streaming traffic flow on a network, the system comprising:
    a factor determination module configured to collect data associated with a plurality of video streaming traffic flows;
    a model module configured to create a model based on the collected data, wherein the model is created by:
        determining a health of a video buffer comprising:
            at predetermined intervals while each of the plurality of video streaming traffic flows plays:
                determining a playback time of a video;
                determining a real time of the video; and
            at the end of the video determining a health of the video buffer score based on a function of the playback time and the real time at the predetermined intervals;

determining a video resolution score for each of the plurality of video streaming traffic flows;

determining a throughput score for each of the plurality of video streaming traffic flows;

determining a device type score for each of the plurality of video streaming traffic flows; and determining a weighting associated with each of the scores;

an analysis module configured to determine factors associated with a new video streaming traffic flow and analyze the factors based on the model;

a QoE engine configured to determine a QoE score based on the analysis of the factors.

11. The system according to claim 10, wherein the factor determination module is configured to collect the data comprising: video buffer health, video resolution, throughput and device type.

12. The system of claim 10, wherein the health of the video buffer score comprises a time dimension where previous buffer health scores at the predetermined intervals are considered at following intervals of the buffer health score.

13. The system of claim 10, wherein the analysis module is configured to determine a weight of each factor of the factors based on the model; and the QoE engine is configured to aggregate weighted factors to determine the QoE score.

14. The system of claim 10, wherein the QoE engine is configured to notifying a network provider associated with the plurality of video streaming traffic flows of QoE scores below a predetermined threshold.

15. The system of claim 10, wherein the QoE engine is configured to aggregate a plurality of QoE scores of network dimensions.

16. The system of claim 15, wherein the network dimensions comprise: location; network type; application type; and application provider.

17. The system of claim 10 wherein the QoE engine is further configured to provide a notification of the QoE score.

18. The system of claim 10 wherein the QoE engine is further configured to suggest or implement traffic policies or actions based on the determined QoE score or an aggregate of determined QoE scores.

* * * * *